United States Patent [19]
Bulgier et al.

[11] 3,979,255
[45] Sept. 7, 1976

[54] METHOD FOR OPERATING A SYSTEM WITH A VARIABLE EXCURSION MARGIN SETPOINT

[75] Inventors: Lawrence Ware Bulgier, West Suffield; Charles Ronald Musick, Vernon, both of Conn.

[73] Assignee: Combustion Engineering, Inc., Windsor, Conn.

[22] Filed: Sept. 4, 1973

[21] Appl. No.: 394,030

[52] U.S. Cl. .............................................. 176/20 R
[51] Int. Cl.² ........................................... G21C 7/00
[58] Field of Search ............... 176/20 R, 24; 73/537; 60/39.28

[56] References Cited
UNITED STATES PATENTS

| | | | |
|---|---|---|---|
| 3,019,602 | 2/1962 | Plummer | 73/537 |
| 3,219,939 | 11/1965 | Vincent | 328/140 |
| 3,423,285 | 1/1969 | Curry et al. | 176/20 R |

Primary Examiner—Samuel Feinberg
Attorney, Agent, or Firm—Stephen L. Borst

[57] ABSTRACT

A method for operating a nuclear reactor or any other machine or industrial process where it is of importance to terminate operation when a given parameter deviates from a variable operating value by more than a given amount regardless of the rate at which the deviation occurs. A variable setpoint is continuously generated from the past history of the operating parameter by adding the current value to a predetermined excursion margin whenever this causes the variable setpoint to decrease. The setpoint remains constant whenever the operating parameter is increasing so that a system trip is initiated whenever the setpoint is exceeded. The variable setpoint is permitted to increase to within the excursion margin of the operating parameter only when independent authorization is given indicating that the increase is legitimate.

9 Claims, 4 Drawing Figures

METHOD FOR OPERATING A SYSTEM WITH A VARIABLE EXCURSION MARGIN SETPOINT

BACKGROUND OF THE INVENTION

This invention relates to a method of operating a system in which an excursion in some variable parameter necessitates immediate responsive action. More specifically, this invention may be applied to monitor parameters of a nuclear reactor in order to respond to safety related excursions.

PRIOR ART

In many machines and industrial processes, safety requires that an excursion in some vital plant variable (e.g., nuclear reactor power) greater than a preset amount cause automatic trip (rapid shutdown) of the process. "Excursion" is defined, for the purpose of this application as a change in the increasing or decreasing direction from the present value of the variable, at any rate of change. In addition, normal startup or shutdown of many machines and industrial processes requires the capability to suspend the trip function by manual action or by automatic surveillance equipment in order that the excursion tripping mechanism not trip the machine or process when the variable is legitimately increasing or decreasing. Automatic trips with automatically computed setpoints according to plant conditions have been developed and commercially used. The prior art has been unable, however, until the present invention, to calculate a continually variable excursion setpoint from present and past values of the variable which was responsive both to excursions of short duration and to excursions of long duration that take many minutes or even hours to develop.

It has been well known in the art to initiate a variable setpoint excursion trip of very short duration by utilizing a high pass filter which would pass very rapidly changing signals. Such an apparatus and method was unable, however, to detect an excursion which was long in developing but which was equally as important to detect as the short excursions. Another prior art device utilizd a circuit which incorporated an operational amplifier integrator circuit to calculate the variable setpoint. This prior art device, however, had the defect that the voltage across the capacitors in the feedback loop of the operational amplifier would drift thereby causing the setpoint to change thus rendering the equipment unsuitable for accurate detection of a lengthy excursion.

SUMMARY OF THE INVENTION

This invention discloses a method for operating a nuclear reactor or any machine or process where it is of importance for safety reasons to terminate operation when a given parameter deviates from a variable operating value by more than a given amount regardless of the rate at which the deviation occurs. A variable setpoint is continually generated from the past history of the operating parameter. The setpoint is generated by adding to the current value of operating parameter a predetermined excursion margin whenever this causes the variable setpoint to decrease. Thus, the setpoint will follow the operating parameter in a downward direction. If, however, the operating parameter remains constant or increases the setpoint is not permitted to change unless independently permitted to do so. Such permission is uspplied only when it has been determined that such an increase is legitimate. When such permission is supplied, the setpoint can only increase to within the excursion margin of the operating parameter. The system is caused to trip when the setpoint is exceeded regardless of how long it has taken for the operating parameter to climb to the point where it has a value higher than the setpoint. The same technique may be applied in a similar manner to excursions in the negative direction.

DESCRIPTION OF THE DRAWINGS

The present invention may be better understood and it numerous objects and advantages will become apparent to those skilled in the art by reference to the accompanying drawings in which.

DESCRIPTION OF THE PREFERRED EMBODIMENT

While not limited thereto in its utility, the present invention is particularly well-suited for use in and as a safety system for a nuclear reactor. Accordingly, solely for purposes of explanation, the invention will be described in the environment of a nuclear reactor. Many systems in the nuclear reactor steam supply system require various important parameters to be monitored for safe operation of the system. A select few of these parameters are characterized by the seriousness of the consequences in the event that the parameter exhibit an excursion which violates a certain permissible margin. One system which relies on such a critical parameter is the emergency core coolant injection system. This safety system is designed to respond to an accident such as a main coolant line break which drains the reactor core, called a loss of coolant accident, by injecting emergency coolant into the core so that the core does not melt. A loss of coolant accident is detected by a primary coolant pressure drop which exceeds a predetermined value and which is indicative of a ruptured coolant pipe. U.S. Pat. No. 3,528,884 issued to A. R. Collier et al describes one such system. In that described system, the emergency coolant is injected into the core through a check valve which is activated by a differential pressure. That is, when the pressure of the primary coolant in the reactor pressure vessel is above the pressure of the tank which contains the injection water, the check valve prevents the injection water from entering the pressure vessel. When the pressure of the primary coolant in the reactor pressure vessel drops or undergoes an excursion to a pressure which is below the pressure in the tank containing the emergency coolant, the check valves automatically open and the emergency coolant is forced into the core. One deficiency with this system is that the system necessarily will not work when the reactor is being started or when the reactor is being shut down. During these operations the pressure of the primary coolant in the reactor pressure vessel is below the pressure in the tank containing the emergency coolant. Therefore, a control valve has to be closed which isolates the emergency core coolant and prevents the operation of the emergency core coolant injection system.

Figure 1:
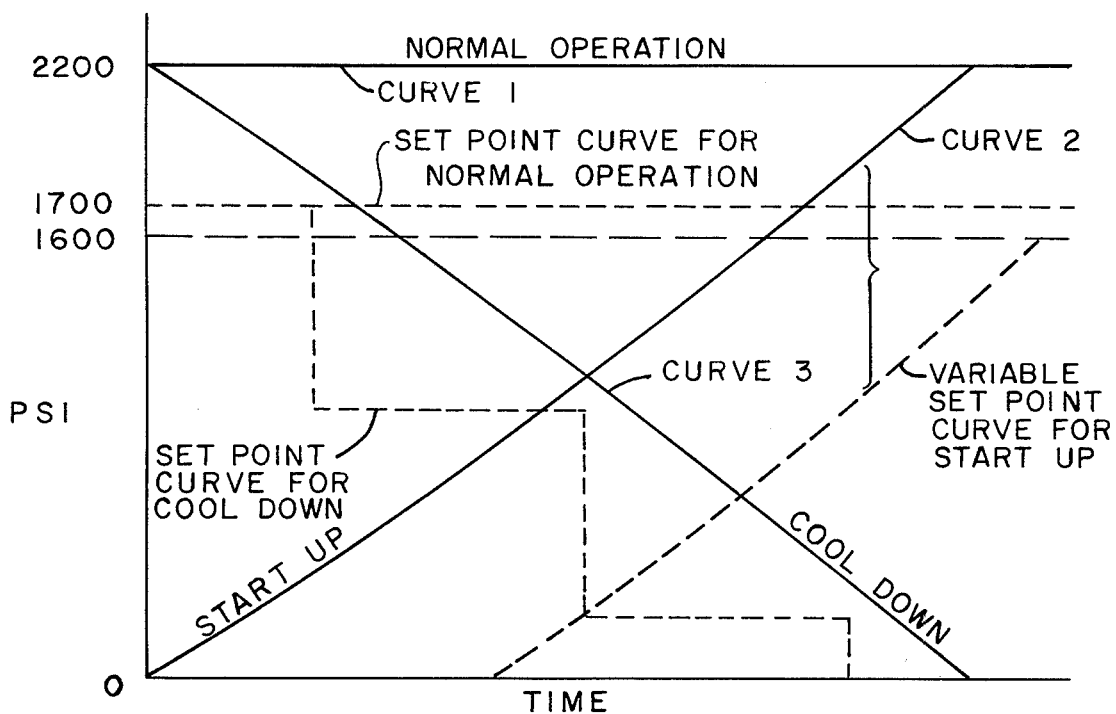
FIG. 1 is a plot of the various operating curves of interest for the operation of a nuclear reactor steam supply system indicating the operating parameter of pressure and its variable setpoint.

The present invention enables the generation of a variable setpoint as opposed to a fixed setpoint described in the above U.S. patent so that the emergency core coolant injection system remains operative both during startup and shutdown of the reactor. The present invention also enables pressure maneuvering which allows the pressure to be dropped below the rigidly fixed setpoint characteristic of the prior art system. FIG. 1 illustrates three operating situations: (1) reactor startup from a primary pressure of zero psia to operating pressure of 2,250 psia; (2) reactor shutdown from 2,250 psia; and (3) normal operation of the reactor which occurs at approximately 2,250 psia. In that figure, Curve 1 is the normal operation curve, Curve 2 is the startup curve and Curve 3 is the shutdown curve. The broad dashed horizontal line at about 1600 psia illustrates the fixed setpoint of th prior art system. Therefore, if during operation of the reactor, with the prior art system the primary pressure were to drop from 2,250 psia down to or below 1600 psia, the setpoint would trigger the automatic emergency core injection system. This is not necessarily a desirable result unless the pressure drop was caused by the break of a primary coolant line.

It can be seen from the curves in FIG. 1 that Curves 2 and 3 representing reactor startup and reactor shutdown involve pressures well below the fixed setpoint of 1600 psia. Therefore, in order to prevent automatic emergency core coolant injection with the prior art system during startup and shutdown, the injection system must be bypassed. The present invention allows the generation of a variable setpoint as illustrated in the drawing by the dotted lines. The variable setpoint on Curve 2 is a dotted line which is spaced approximately 500 psia below the operating pressure of Curve 2. The pressure setpoint automatically varies upwardly as the Curve 2 increases. The corresponding setpoint for Curve 3 is a horizontal line which starts out at approximately 1750 psia and takes a steplike shape as the Curve 3 decreases. The vertical portion of this setpoint curve cones into existence only when an operator or some other independent device gives permission to the apparatus to decrease the setpoint. When this permission is granted, the setpoint can only be decreased to a value of approximately 500 psia below the existing pressure. Therefore, lacking such permission, the setpoint would remain at 1750 psia and the dropping pressure of Curve 3 would initiate automatic emergency core coolant injection when the Curve 3 dropped below its setpoint. Curve 1 also has a corresponding setpoint curve which is the horizontally dotted line at approximately 1750 psia.

From an examination of these curves in FIG. 1, it can be seen that the present invention enables a setpoint generation which automatically is allowed to increase but is not allowed to automatically decrease upon the operating pressure decrease. In this way the operating pressure can increase without triggering emergency core coolant injection but cannot decrease below the predetermined excursion margin without tripping protective action unless independent authorization is given. Such independent authorization will normally be given by the reactor operator after he has checked various gauges and has verified that the prssure drop is intended and has not been caused by a primary coolant leak. While it is contemplated that a human will normally make such a decision, it is conceivable that such authorization can be made by automatic means such as a time clock which automatically allows the periodic downward readjustment of the pressure setpoint: the period depending on the characteristics of the excursion being monitored. Another alternative would be a monitor-logic system which would give authorization only if a given number of criteria were met.

The above description describes a situation where the excursion of importance is a downward excursion. The scope of this invention, however, is not so limited and also encompasses the situation where an upward excursion is the event which is to be detected. One example of an upward excursion is a reactor core power excursion which initiates what is called in reactor control terminology an "over power trip". Some reactor protective systems, such as the one described in U.S. Pat. No. 3,791,922 entitled Thermal Margin Protection System by Charles R. Musick, require the assurance that operation of the reactor during excursions greater than a predetermined amount be prevented in order to assure that initial assumptions made by the reactor designers in designing the protection system are met. In this case the reactor power excursion setpoint is allowed to decrease but is not allowed to increase without independent permission, thereby assuring that a reactor trip will occur if the power deviates from its last minimum by a value equal to or greater than the allowable excursion margin.

Figure 3:
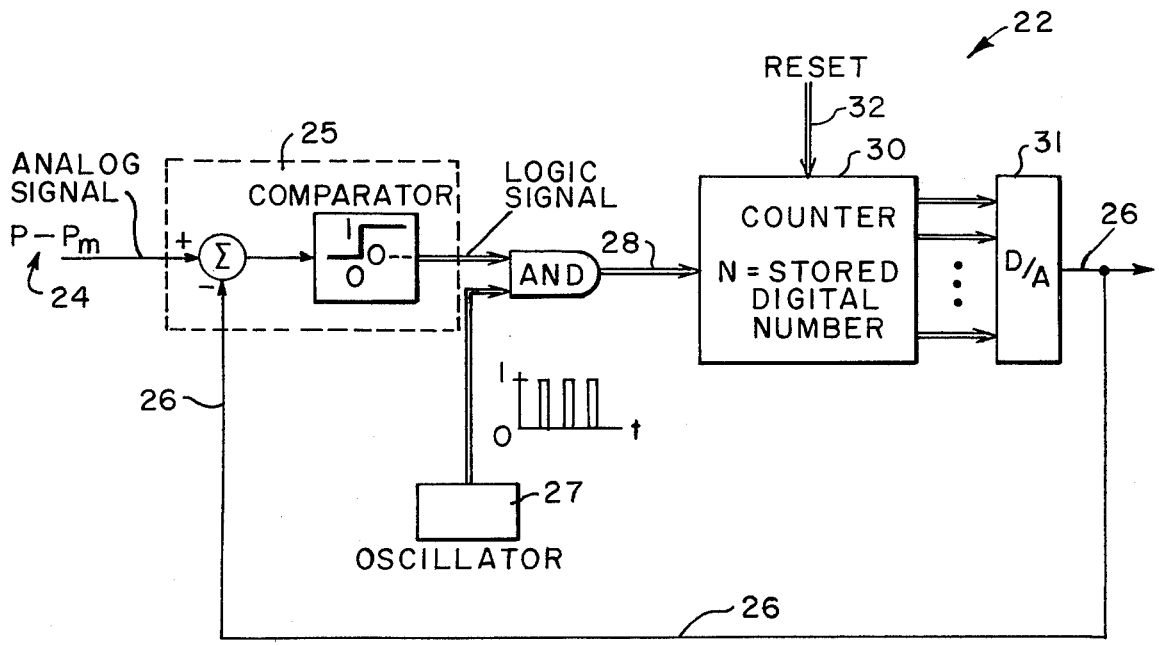
FIG. 3 is a simplified schematic of a commercially available digital peak picker which is utilized in the apparatus of FIG. 2.
Figure 2:
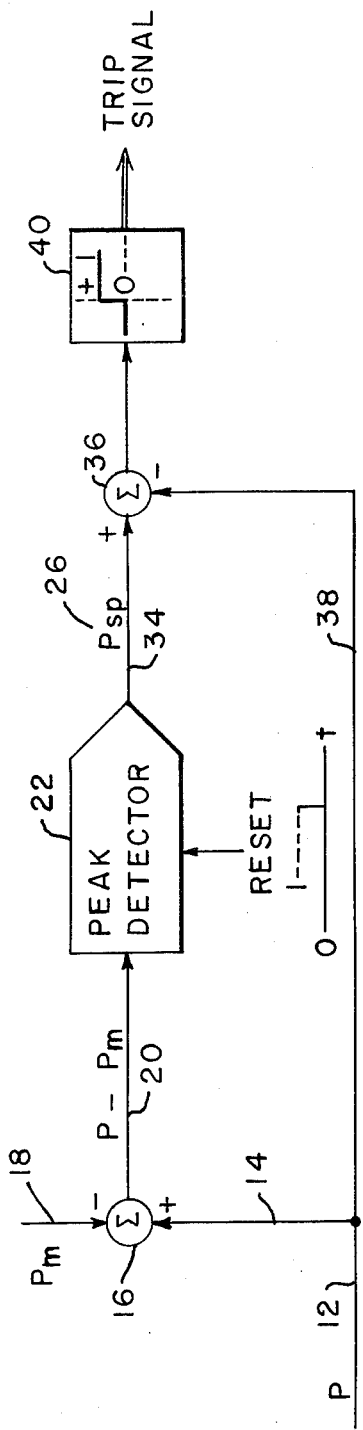
FIG. 2 is a schematic of the apparatus for generating a variable setpoint and for tripping the reactor when the setpoint is violated.

Turning now to FIGS. 2 and 3, the apparatus necessary to accomplish the generation of the variable setpoint which is automatically allowed to change in one direction but not in the other will be described. The pressure of the primary coolant (the invention is equally as applicable to the pressure of the secondary coolant) is determined by some transmitter (not shown). One such pressure transmitter commercially available from Fischer and Porter Company is their model 5OEP1000. The pressure signal P is transmitted through wire 12 and 14 to an algebraic summer 16. Also supplied to summer 16 is a signal indicative of the predetermined excursion margin ($P_m$) via wire 18. The excursion margin may be predetermined by the system designers by a knowledge of the operating characteristics and tolerances of the particular system. In a pressurized water nuclear reactor a simultaneous reactor-turbine trip results in a primary coolant pressure drop of approximately 450 psia. Therefore, in order not to incur emergency core coolant injection upon such an incident, the predetermined excursion margin ($P_m$) must be at least greater than 450 psia. It should also be recognized that the excursion margin may be continually changed depending on operating conditions of the system or depending on some other parameter such as time. This excursion margin $P_m$ may be a simple input from a potentiometer and a power source (not shown). The summing element 16, well known in the electronics art, generates a signal commensurate with $P-P_m$ which is then delivered via wire 20, to a digital peak picker 22. The digital peak picker 22 is a well known and commercially available component such as manufactured by Hybrid Systems Corporation under the model No. 5648 or 750 and the particular construction does not form a part of the present invention. However, merely for illustrative purposes, the digital peak picker is depicted in FIG. 3 and will be described briefly hereinafter.

Functionally, the peak picker 22 compares in comparator 25 the analogue signal of P–P$_m$ (24) to the peak pickers analogue output 26 and converts their difference into a digital signal 28. As long as a positive difference between P–P$_m$ (24) and the peak picker's output 26 exists, unit bits from oscillator 27 are fed to a counter 30 which counts and stores the total number of bits that it has received. The total number is continually retranslated by digital-analogue converter 31 into an analogue signal 26 which represents the last peak value of the incoming P–P$_m$ (24) signal. This peak value is continually supplied back to the original comparator 25 for comparison with P–P$_m$(24). When P–P$_m$(24) falls below the peak pickers output 26, comparator 25 discontinues its signal and bit stream 28 falls to zero so that the counter 30 no longer has an input and can no longer increase its counted and recorded number. Thus, the output signal 26 tracks and holds the highest or peak value of P–P$_m$(24).

Manual reset provision is made in the peak picker 22 by a reset signal 32 which wipes out the counter's (30) memory and returns all memory registers to zero. This in turn immediately drops the output signal 26 to zero and the whole system begins recounting until the output signal 26 has reached the new value of P–P$_m$(24). The entire reset operation takes an approximate total time ranging from a few seconds to a few microseconds.

Returning to FIG. 2, the output 26 of the peak picker 22 is symbolized by P$_{sp}$ and is called the pressure setpoint. This pressure setpoint P$_{sp}$ is delivered via wire 34 to a summer 36 which also receives an input of the original operating pressure P through wire 38. The summer subtracts the value of the operating pressure P from the pressure setpoint P$_{sp}$ and when this difference is positive, indicating that the operating pressure has dropped below the permitted maximum deviation, a digital trip signal is sent by bistable 40 to the appropriate reactor tripping and emergency core coolant injection systems.

By means of the above described apparatus, a pressure setpoint which represents the maximum allowable deviation of primary coolant pressure from the operating pressure is continually generated. The pressure setpoint is allowed to track or to automatically increase to higher values corresponding with increases in operating pressure but is not allowed to automatically decrease with decreasing operating pressure. For the purposes of this description and appended claims, the term "tracking and holding" means automatically following a change in one direction of the tracked signal while holding that value during changes in the opposite direction. If the operating pressure does not increase, then the pressure setpoint will remain at a constant value until either manually reset or until the primary pressure passes through the setpoint which initiates reactor scram and emergency core coolant injection procedures. A slight variation, which should be obvious to a person ordinarily skilled in the electronics art, enables the above described peak picker to be applied to pick valleys rather than peaks. The slight modification required constitutes some signal preshaping which subtracts the parameter signal from a reference potential before the shaped signal is delivered to the peak picker. The peak picker operates on this inverted signal to pick the inverted valleys. A second step adds back in the reference potential to convert the inverted valleys back into true valleys. This final signal then constitutes the setpoint to which the operating parameter is compared for the generation of a trip signal when the actual parameter exceeds the setpoint.

Figure 4:
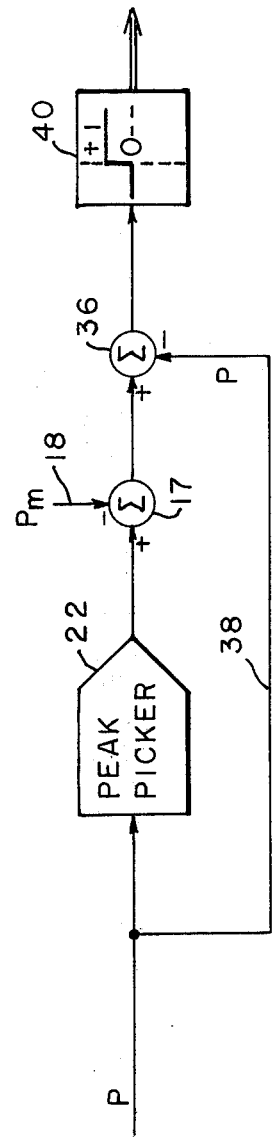
FIG. 4 is a schematic of a second embodiment of apparatus for generating a variable setpoint and for tripping the reactor when the setpoint is violated.

A second embodiment of the apparatus required to practice the present invention appears in FIG. 4. Like the apparatus described above and illustrated in FIG. 2, the embodiment may be applied to generate a continually varying setpoint for either positive or negative excursions. In contrast to the first embodiment, the apparatus illustrated in FIG. 4 tracks not the maximum value of the difference of the monitored parameter and the excursion margin, but it tracks the maximum value of only the monitored parameter and then subtracts the excursion margin to generate the setpoint.

An operating parameter signal (pressure P) is first transmitted directly to the peak picker 22. The peak picker operates in a manner similar to that described above and tracks and holds the highest pressure P$_h$ experienced in the system. This highest value (P$_h$) is transmitted to summer 17 which subtracts the excursion margin P$_m$ to generate a signal commensurate with P$_{Pm}$ which is the variable setpoint for the system. This setpoint signal, P$_h$ − P$_m$ is then delivered to a second summer 36 which subtracts from P$_h$− P$_m$ the current value of the incoming pressure signal P which has by-passed the peak picker 22 via wire 38. When this difference is positive, meaning the operating pressure has dropped below the permitted maximum deviation, a digital trip signal is sent by bistable 40 to the appropriate reactor tripping and emergency core coolant injection systems.

In a manner similar to that discussed above for the first described embodiment, the circuitry in the second embodiment may also be altered by one skilled in the art so that the second embodiment tracks minimum values of the operating parameter rather than maximum values. In addition, the peak picker of the second disclosed embodiment also has a reset means which allows an independent decision maker to permit the setpoint to be lowered (or raised as the case may be) after it has been determined that independent justification exists.

What is claimed is:

1. A method of operating a system in response to a system parameter excursion of determinable magnitude but of indeterminate length, the method comprising the steps of:
    a. determining a maximum allowable parameter excursion to determine an excursion margin;
    b. monitoring said parameter;
    c. generating a variable excursion setpoint by tracking and holding the minimum value of the sum of said monitored parameter and said excursion margin;
    d. resetting said excursion setpoint to a value larger than said minimum value of the sum of said excursion margin and said monitored parameter only on permission from an independent decision maker;
    e. comparing said monitored parameter to said setpoint; and
    f. instituting responsive action when said monitored parameter exceeds said setpoint.

2. A method of operating a system in response to a system parameter excursion of determinable magnitude but of indeterminate length, the method comprising the steps of:
 a. determining a maximum allowable parameter excursion to determine an excursion margin;
 b. monitoring said parameter;
 c. generating a variable excursion setpoint by tracking and holding the maximum value of the difference of said monitored parameter and said excursion margin;
 d. resetting said excursion setpoint to a value less than said maximum value of the difference of said monitored parameter and said excursion margin only on permission from an independent decision maker;
 e. comparing said monitored parameter to said setpoint; and
 f. instituting appropriate responsive action when said monitored parameter falls below said setpoint.

3. The method as recited in claim 2 wherein said system is a pressurized water nuclear reactor and said system parameter is the pressure of the primary coolant, said step of instituting responsive action including the steps of:
 a. scramming said reactor; and
 b. flooding the core of said reactor with emergency core coolant water.

4. The method as recited in claim 1 wherein said system is a nuclear reactor and said system parameter is the operating core power.

5. The method as recited in claim 2 wherein said system is a pressurized water nuclear reactor and said system parameter is the pressure of the secondary coolant.

6. A method of operating a system in response to a system parameter excursion of determinable magnitude but of indeterminate length by means of a continuously generated variable setpoint, the method comprising the steps of:
 a. determining a maximum allowable parameter excursion to establish an excursion margin;
 b. monitoring said parameter to generate a parametric signal commensurate with said parameter;
 c. adding said excursion margin to said parametric signal to generate a signal commensurate with their sum;
 d. comparing the last existing setpoint to said signal commensurate with said sum;
 e. decreasing said setpoint only when said setpoint is greater than said signal commensurate with said sum;
 f. increasing said setpoint when said setpoint is less than said signal commensurate with said sum only when independent permission is supplied from an independent decision maker;
 g. comparing said signal commensurate with said monitored parameter to said setpoint; and
 h. instituting responsive action when said comparison to said setpoint of step (g) indicates that said monitored parameter exceeds said setpoint.

7. A method of operating a system in response to a system parameter excursion of determinable magnitude but of indeterminate length by means of a continuously generated variable setpoint, the method comprising the steps of:
 a. determining a maximum allowable parameter excursion to establish an excursion margin;
 b. monitoring said parameter to generate a parametric signal commensurate with said parameter;
 c. subtracting said excursion margin from said parametric signal to generate a signal commensurate with their difference;
 d. comparing the last existing setpoint to said signal commensurate with said difference;
 e. increasing said setpoint only when said setpoint is less than said signal commensurate with said difference;
 f. decreasing said setpoint when said setpoint is greater than said signal commensurate with said difference only when independent permission is supplied from an independent decision rather;
 g. comparing said signal commensurate with said monitored parameter to said setpoint; and
 h. instituting responsive action when said comparison to said setpoint of step (g) indicates that said monitored parameter is less than said setpoint.

8. A method of operating a system in response to a system parameter excursion of determinable magnitude but of indeterminate length, the method comprising the steps of:
 a. determining a maximum allowable parameter excursion to determine an excursion margin;
 b. monitoring said parameter;
 c. generating a variable excursion setpoint by adding said excursion margin to the smallest value attained by said monitored parameter;
 d. resetting said excursion setpoint by adding said excursion margin to a value of said monitored parameter larger than said smallest value attained by said monitored parameter only on permission from an independent decision maker;
 e. comparing said monitored parameter to said setpoint; and
 f. instituting responsive action when said monitored parameter exceeds said setpoint.

9. A method of operating a system in response to a system parameter excursion of determinable magnitude but of indeterminate length, the method comprising the steps of;
 a. determining a maximum allowable parameter excursion to determine an excursion margin;
 b. monitoring said parameter;
 c. generating a variable excursion setpoint by subtracting said excursion margin from the largest value attained by sai monitored parameter;
 d. resetting said excursion setpoint by subtracting said excursion margin from a value of said monitored parameter smaller than said largest value attained by said monitored parameter only on permission from an independent decision maker;
 e. comparing said monitored parameter to said setpoint; and
 f. instituting responsive action when said monitored parameter is less than said setpoint.

* * * * *

UNITED STATES PATENT OFFICE
CERTIFICATE OF CORRECTION

PATENT NO. : 3,979,255
DATED : September 7, 1976
INVENTOR(S) : Lawrence Ware Bulgier et al It is certified that error appears in the above-identified patent and that said Letters Patent are hereby corrected as shown below:

Column 1, line 68, change "uspplied" to --supplied--.

Column 2, line 13, change "it" to --its--.

Column 3, line 23, change "th" to --the--;
Column 3, line 47, change "cones" to --comes--.

Column 4, line 2, change "prssure" to --pressure--.

Column 6, line 26, change "$P_{Pm}$" to --$P_h - P_m$--.

Column 8, line 18, change "rather" to --maker--;
Column 8, line 53, change "sai" to --said--.

Signed and Sealed this

Third Day of May 1977

[SEAL]

Attest:

RUTH C. MASON
Attesting Officer

C. MARSHALL DANN
Commissioner of Patents and Trademarks